United States Patent
Duggleby et al.

(10) Patent No.: US 11,846,273 B1
(45) Date of Patent: Dec. 19, 2023

(54) REACTOR ROCKET ENGINE

(71) Applicant: VENUS AEROSPACE CORP, Houston, TX (US)

(72) Inventors: Andrew Thomas Duggleby, Houston, TX (US); Aaron Ezekiel Smith, Houston, TX (US); Nicholas D. Cardwell, Houston, TX (US); Christian Bailey, Houston, TX (US)

(73) Assignee: VENUS AEROSPACE CORP, Houston, TX (US)

( * ) Notice: Subject to any disclaimer, the term of this patent is extended or adjusted under 35 U.S.C. 154(b) by 0 days.

(21) Appl. No.: 17/820,512

(22) Filed: Aug. 17, 2022

(51) Int. Cl.
- *F03H 3/00* (2006.01)
- *F02K 9/64* (2006.01)
- *B64G 1/40* (2006.01)
- *G21D 5/02* (2006.01)
- *F03H 1/00* (2006.01)

(52) U.S. Cl.
CPC .............. *F03H 3/00* (2013.01); *B64G 1/401* (2013.01); *B64G 1/408* (2013.01); *F02K 9/64* (2013.01); *F03H 1/0006* (2013.01); *F03H 1/0081* (2013.01); *G21D 5/02* (2013.01)

(58) Field of Classification Search
CPC ......... B64G 1/405; B64G 1/408; B64G 1/409
See application file for complete search history.

(56) References Cited

U.S. PATENT DOCUMENTS

| | | | |
|---|---|---|---|
| 4,147,590 A | 4/1979 | Szekely | 176/39 |
| 5,207,760 A | 5/1993 | Dailey et al. | 60/202 |
| 5,287,512 A | 2/1994 | Pettus | 376/318 |
| 5,410,578 A | 4/1995 | Walton | 376/318 |
| 5,866,871 A * | 2/1999 | Birx | F03H 1/0087 219/121.48 |
| 6,459,205 B1 * | 10/2002 | Schall | F03H 3/00 244/171.1 |
| 9,982,156 B1 * | 5/2018 | Lohmeier | G02B 1/113 |
| 10,443,139 B2 | 10/2019 | Mills | C25B 13/04 |
| 10,643,754 B2 * | 5/2020 | Venneri | G21C 15/08 |
| 10,910,198 B2 * | 2/2021 | Hummelt | H01J 37/32247 |
| 11,230,776 B2 | 1/2022 | Mills | C25B 13/04 |
| 2013/0145761 A1 * | 6/2013 | McAlister | F24S 23/71 60/641.1 |
| 2013/0263597 A1 * | 10/2013 | Chauvin | B60L 58/27 136/202 |
| 2020/0283174 A1 * | 9/2020 | Kokorich | B64G 1/402 |
| 2021/0404419 A1 * | 12/2021 | Sercel | F02K 9/42 |

OTHER PUBLICATIONS

Brilliant Light Power SunCell reactor commercially available from Brilliant Light Power, Inc., of Cranbury, New Jersey, www.brilliantlightpower.com, accessed Oct. 6, 2022.

* cited by examiner

*Primary Examiner* — Kyle Robert Thomas
(74) *Attorney, Agent, or Firm* — HAYES SOLOWAY P.C.

(57) ABSTRACT

A rocket configured to employ superheated water as a propellant, includes a photon reactor including a photon generator configured to generate UV light to superheat water.

12 Claims, 11 Drawing Sheets

REACTOR ROCKET ENGINE

FIELD OF THE DISCLOSURE

The present disclosure relates to rocket vehicles and rocket engines.

BACKGROUND AND SUMMARY

Rocket vehicles carry their own propellants and have engines which produce thrust by the propulsion of an exhaust fluid that has been accelerated to high speed through a propelling nozzle. As used herein the term "rocket engine" means engines that produce thrust by combustion of fuels in the presence of an oxidizer, as well we engines that produce thrust by expelling a reaction mass. The fluid usually is a gas created by high pressure combustion within a combustion chamber, of a solid or liquid propellant, consisting of an oxidizable fuel and oxidizer components. As the gasses expand through the nozzle, they are accelerated to a very high (supersonic) speed, and the reaction to this pushes the rocket vehicle in the opposite direction in accordance with Newton's Third Law.

Due to the need to carry both a combustible or oxidizable fuel and an oxidizing agent, conventional terrestrial based rockets have limited payloads. Worse, typical fuel (e.g., liquid hydrogen) and oxidizers (e.g., liquid oxygen) are not very dense even in liquid form, requiring large tanks causing drag and significant added weight for the tank itself. For example, the Falcon Heavy rocket launch vehicle can lift approximately 64 metric tons to low Earth orbit. Yet a fully fueled Falcon Heavy rocket at launch weighs 3.13 million pounds. Thus, there exists a need for rocket vehicles with higher payload fractions. Denser propellants would thus achieve a higher payload fraction, but no practical method has heretofore been found to use water as a rocket propellant.

In accordance with the present disclosure, we provide a rocket employing superheated water as propellant. More particularly we provide a rocket having a novel rocket propulsion system comprising a photon reactor including a photon generator configured to generate electromagnetic radiation to superheat water. The photon reactor is powered by electrical energy produced by an on-board nuclear reactor. More particularly, the photon reactor is powered by electrical energy produced by an on-board electrical energy generator powered by thermal energy from the nuclear reactor. The on-board electrical energy generator may comprise, by way of example, a Rankine cycle or Sterling cycle electric steam generator, a thermoelectric generator, a pyroelectric generator, a thermionic generator or a magnetohydrodynamic generator. The superheated water flows through an exit nozzle producing thrust. The superheated water produces a significantly higher impulse density compared to conventional combustion fuel rockets resulting in an increased payload mass ratio of eight to ten times or more as compared to conventional combustion fuel rockets.

In one embodiment, the rocket engine comprises a first chamber in which superheated water is maintained under high pressure, and a second chamber in which the superheated water is expressed through the rocket nozzle creating thrust.

In another embodiment, superheated water is maintained under high pressure and flash boiled through a pressure drop producing steam which directed through the rocket nozzle creating thrust.

In one embodiment, the water is pre-heated using water to cool walls of the rocket engine walls and/or the photon reactor walls before super heating the water by the photon reactor.

In one embodiment the photon reactor walls are formed from a high temperature resistant material substantially transparent to the electromagnetic radiation. Such transparent materials may include $MgAlO_4$, Aluminum oxynitride; Yttralox which is ceramic formed of yttria ($Y_2O_3$) containing approximately 10% thorium dioxide ($ThO_2$); YAG which is ceramic formed of yttrium aluminum garnet; and porous silica, which are given as exemplary.

In another embodiment the photon reactor is contained in a mirrored container.

In one embodiment, the water contains powder materials configured to increase or decrease absorption of the electromagnetic radiation. The electromagnetic radiation absorber materials may include tantalum carbide, hafnium carbide or a mixture of tantalum carbide and hafnium carbide, and carbon black which are given as exemplary.

In another embodiment material reflective of electromagnetic radiation such as diamond is coated on walls of the photon generator to cool the walls.

In yet another embodiment the superheated water is passed through one or more of a chevron and screen vane separator, a cyclone, a centrifugal and a steam drum where condensing water is removed and recycled for superheating, prior to being expanded through the nozzle to create thrust.

In another embodiment, we provide a rocket engine comprising a photon reactor including a photon generator configured to generate 10 nm UV light, a source of water, and a nozzle. The photon generator is held in a water tight sealed enclosure having one or more walls formed of a high temperature resistant material substantially transparent to the electromagnetic radiation.

In one embodiment the high temperature resistant material substantially transparent to the electromagnetic radiation forming the wall(s) is selected from the group consisting of magnesium aluminate ($MgAl_2O_3$), aluminum oxynitride, Yttralox ($Y_2O_3$ containing $ThO_2$), yttrium aluminum garnet and porous silica.

In another embodiment of the rocket engine, one or more of a steam drum, a cyclone separator, a centrifuge separator and a chevron and screen vane separator is provided configured for separating liquid water droplets from the superheated water.

In yet another embodiment of the rocket engine side walls of the photon generator are surrounded by heat exchanger jackets for cooling.

BRIEF DESCRIPTION OF THE DRAWINGS

Further features and advantages of the instant disclosure will be seen from the following detailed description taken in conjunction with the accompanying drawings, wherein like numerals depict like part and wherein.

DETAILED DESCRIPTION OF THE INVENTION

Figure 1:
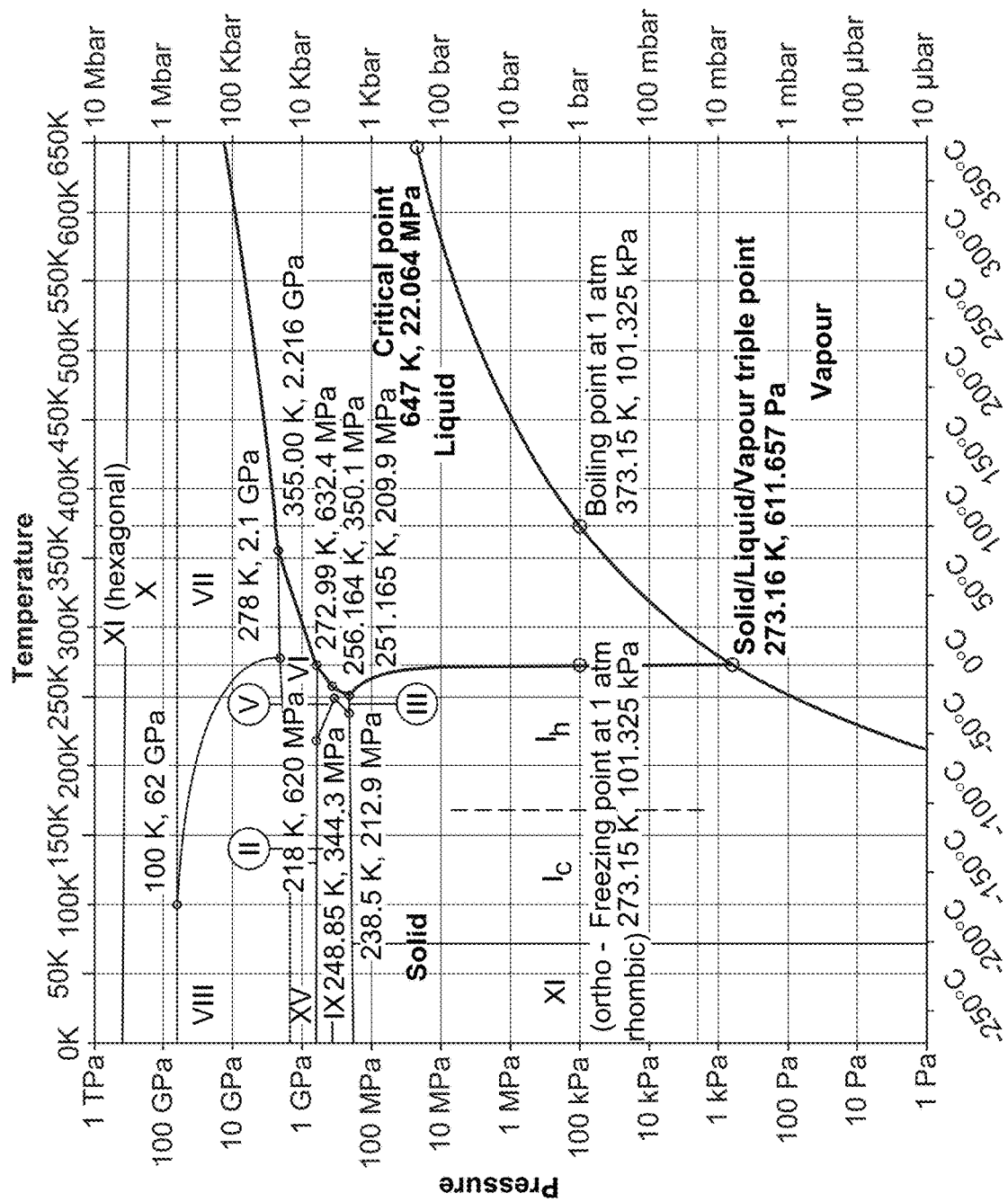
FIG. 1 is a supercritical water phase diagram.

As used herein the term "supercritical water" is water at the temperature and pressure at which distinct liquid and gas phases do not exist. "Supercritical" can be thought of as the "fourth state" of matter. It is the temperature and pressure at which water is not a solid, a liquid or a gas, and appears as something like a vapor. For water, this occurs at 373° C. and 220 Bar. See FIG. 1.

Figure 2:
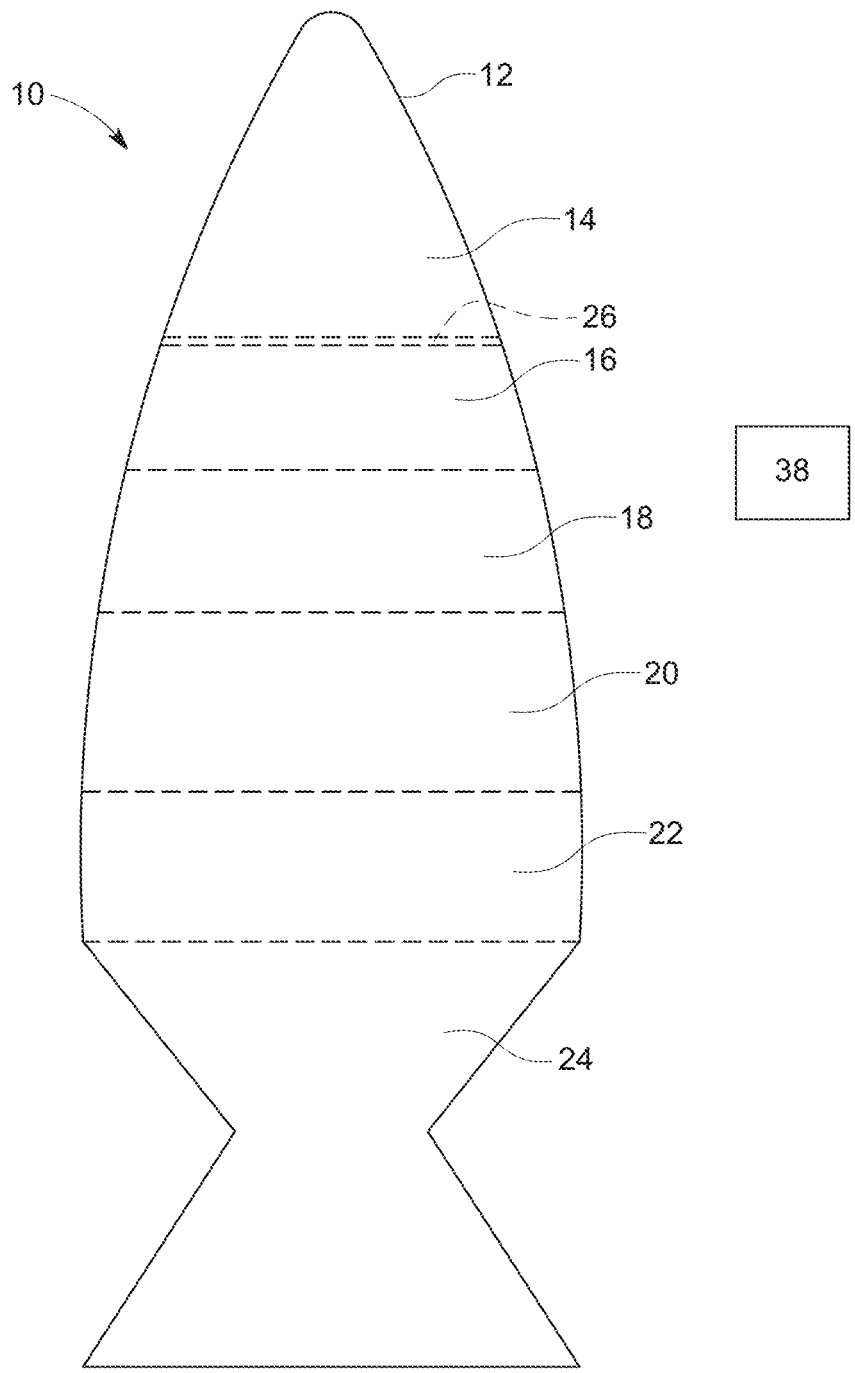
FIG. 2 is a cross-sectional view of a rocket in accordance with the present disclosure.

Referring to FIG. 2, a rocket 10 in accordance with the present disclosure comprises a vessel 12 having a payload section 14, a nuclear reactor section 16, an electrical energy generator section 18, a propellant water storage section 20, a photon reactor section 22, and a nozzle section 24. Pressure vessel 12 preferably includes an internal shield 26 configured to protect contents of the payload section 14 against radiation from the nuclear reactor section 16. In some embodiments, nuclear reactor section 16 and electrical energy generator section 18 are omitted, and photon reactor section 22 comprises a nuclear reactor which inherently generates photons such as described in U.S. Pat. Nos. 10,443,139 and 11,230,776, the contents of which are incorporate herein by reference in their entirety.

Figure 3:
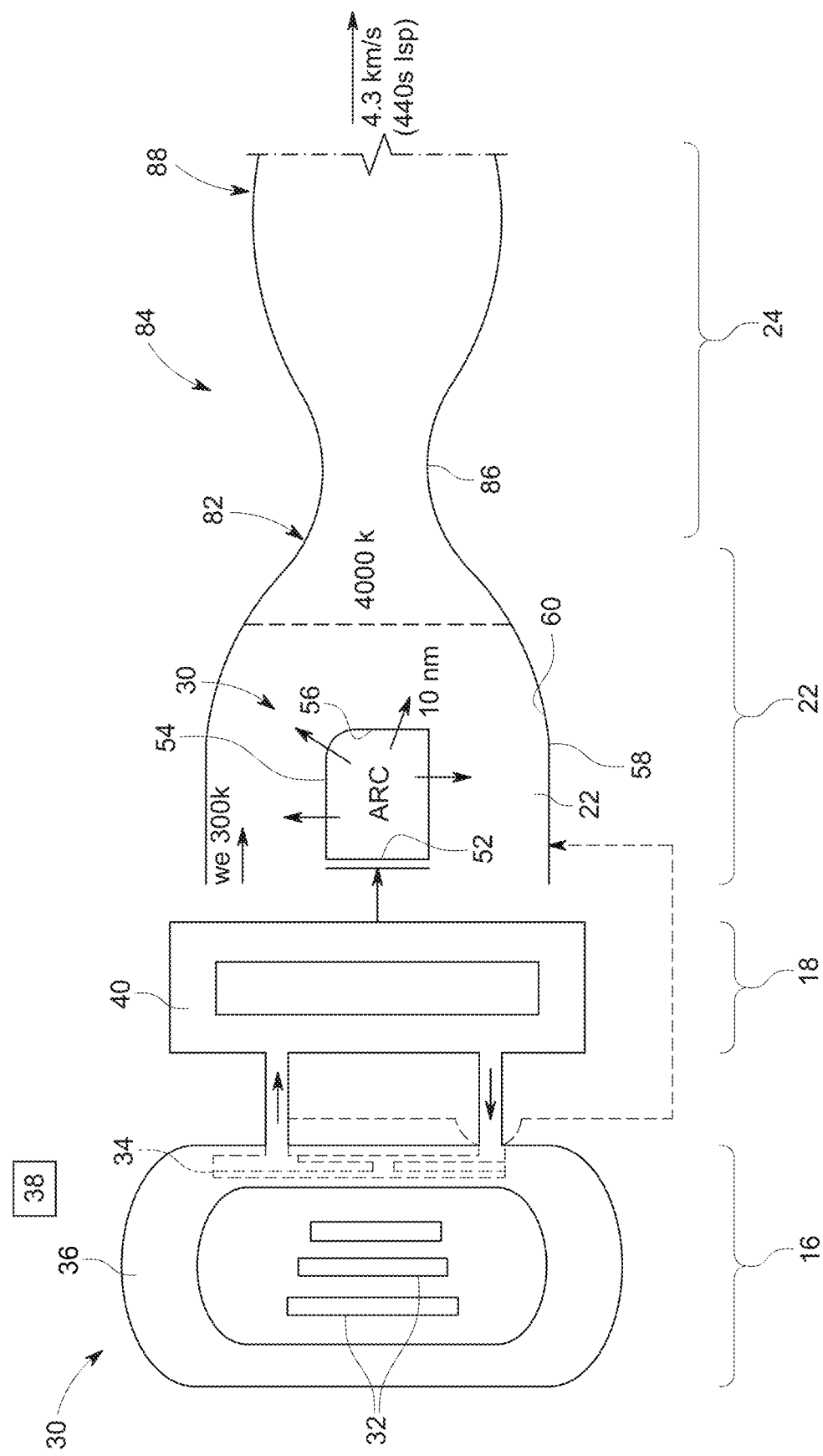
FIG. 3 is a schematic view of elements of the rocket depicted in FIG. 2.

Referring to FIG. 3, nuclear reactor section 16 comprises a reactor core 30 having a plurality of nuclear fuel elements 32. A plurality of passages 34 are formed running through reactor core cooling jacket 36 for circulating a heat exchanger material which may be water as will be discussed below. Also included is a control system 38 configured to control circulation of the heat exchange material (e.g., water) through passages 34, and introduction and withdrawal of nuclear fuel elements 32 in and out of reactor core 30. Heat is generated in the reactor by a nuclear fission reaction, and the heat is then passed to the heat exchange material, e.g., the water circulating in the cooling jacket 36, and the heated water delivered to the electrical generator section 18, wherein thermal energy carried by the water from the nuclear reactor core 30 is converted to electrical energy, in some embodiments by an on-board Rankine cycle or a Sterling cycle generator 40. The generator which converts rotational energy to electrical energy may be a generator, an alternator, or a flux switching alternator. Alternatively, electricity may be produced via direct conversion systems including but not limited to thermoelectric, pyroelectric, thermionic and magnetohydrodynamic thermal to electrical power conversion systems which are given as exemplary.

The electrical energy generated in electrical energy generator section 18 is then passed to photon reactor section 22. Photon reactor section 22 includes a photon emitter 52. In some embodiments photon emitter 52 comprises one or more of an arc lamp, a UV-emitting lamp, a cyclotron, or a microwave emitter. A microwave emitter may be, for example, a magnetron, a solid state microwave system based on power high-electron-mobility transistors (such as AlGaN or GaN), a MASER such as a Solid-state pulsed microwave emitter based on Rydberg excitons, or a metamaterial structure formed by a waveguide that is below cutoff for transverse magnetic modes.

Figure 4:
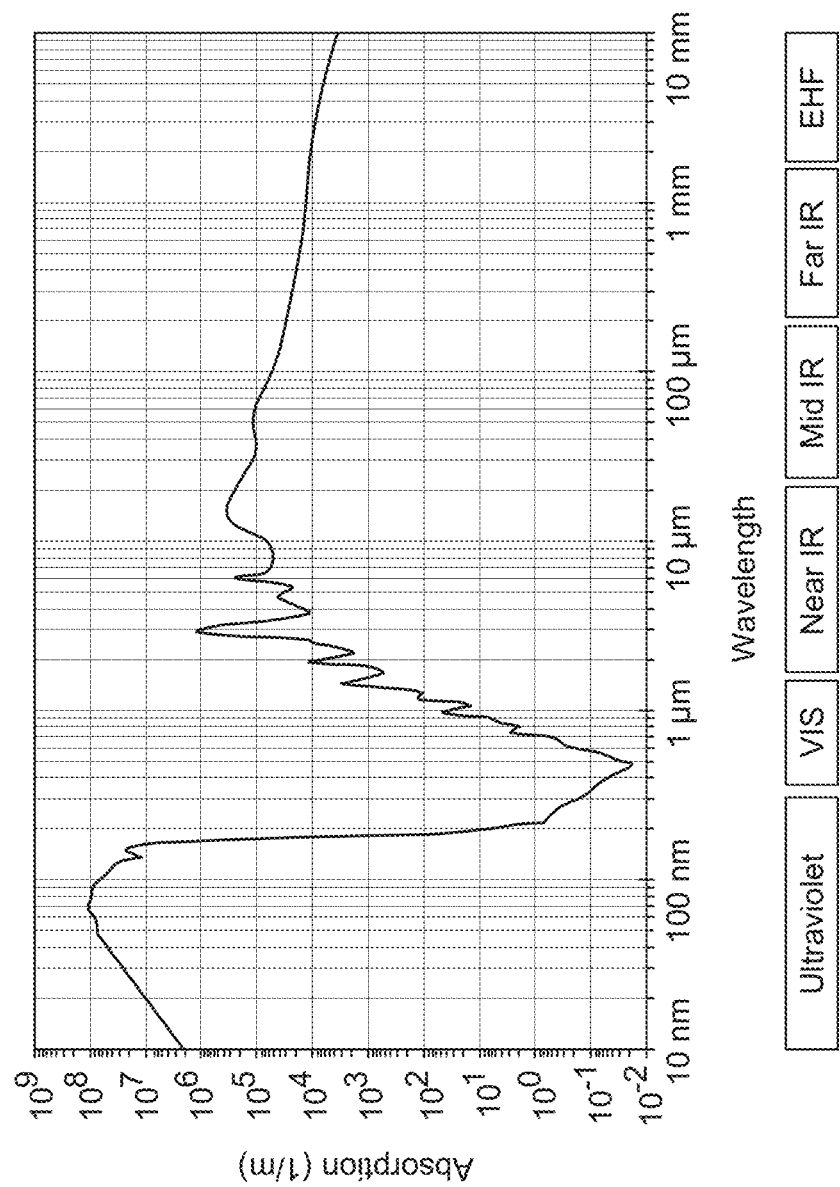
FIG. 4 is a light absorption graph of water at various wavelengths.

In other embodiments, nuclear reactor section 16 and electrical energy generator section 18 are omitted, and photon emitter 52 comprises a nuclear reactor which inherently generates photons, e.g., 10 nm UV light which is a wavelength at which water absorbs energy from photons (see FIG. 4), for example the Brilliant Light Power SunCell reactor commercially available from Brilliant Light Power, Inc., of Cranbury, New Jersey. Photon emitter 52 is disposed in a watertight sealed vessel 54 having walls 56 formed of high temperature resistant materials transparent to the emitted photons, e.g., to UV light. Suitable materials for forming the walls of the vessel 54 include magnesium aluminate ($MgAl_2O_4$), Aluminum oxynitride, Yttralox which is a transparent ceramic consisting of yttria ($Y_2O_3$) containing approximately 10% thorium dioxide ($ThO_2$), YAG (yttrium aluminum garnet), and porous silica which is given as exemplary. Photon emitter 52 is configured to emit photons, e.g., high energy 10 nm UV light, into the interior of photon reactor section 22 which includes a watertight, high pressure-resistant tank 58. The interior walls 60 of tank 58 may be coated with a material reflective to the emitted photons, e.g., to UV light. Water from water storage section 20 is flowed into photon reactor section 22 where it is heated to 4000° K under pressure to supercritical. Water also may be flowed into reactor section preheated by using the water as a coolant for the rocket walls and/or the reactor 30 walls. The supercritical water is then passed to the nozzle section 24, where it flows into the converging section 82 of the nozzle 84, proceeds through the thrust section 86 where the supercritical water is expanded and accelerated in the diverging section 86 of the nozzle creating thrust.

Figure 5:
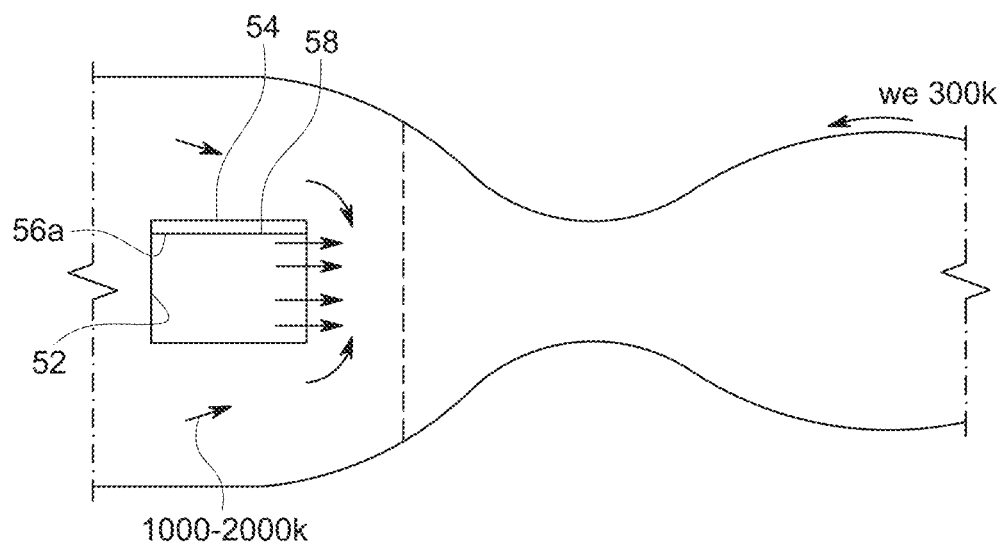
FIG. 5 is a schematic view of an alternative embodiment of an electric photon generator portion of the present disclosure.

Alternatively, as seen in FIG. 5, the side walls of 56a of electric photon generator vessel 54 may be surrounded by heat exchanger jackets 58. In this embodiment, water optionally may first be heated using it as a coolant for the nuclear rocket engine walls and reactor core walls before being superheated by the photon emitter 52.

Figure 6:
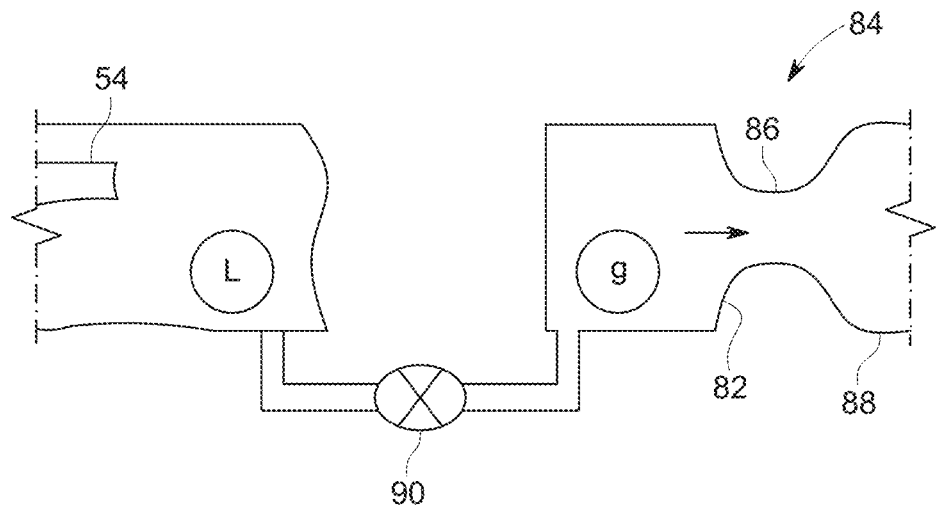
FIG. 6 is a view similar to FIG. 5 of still yet another embodiment of the present disclosure.
Figure 7:
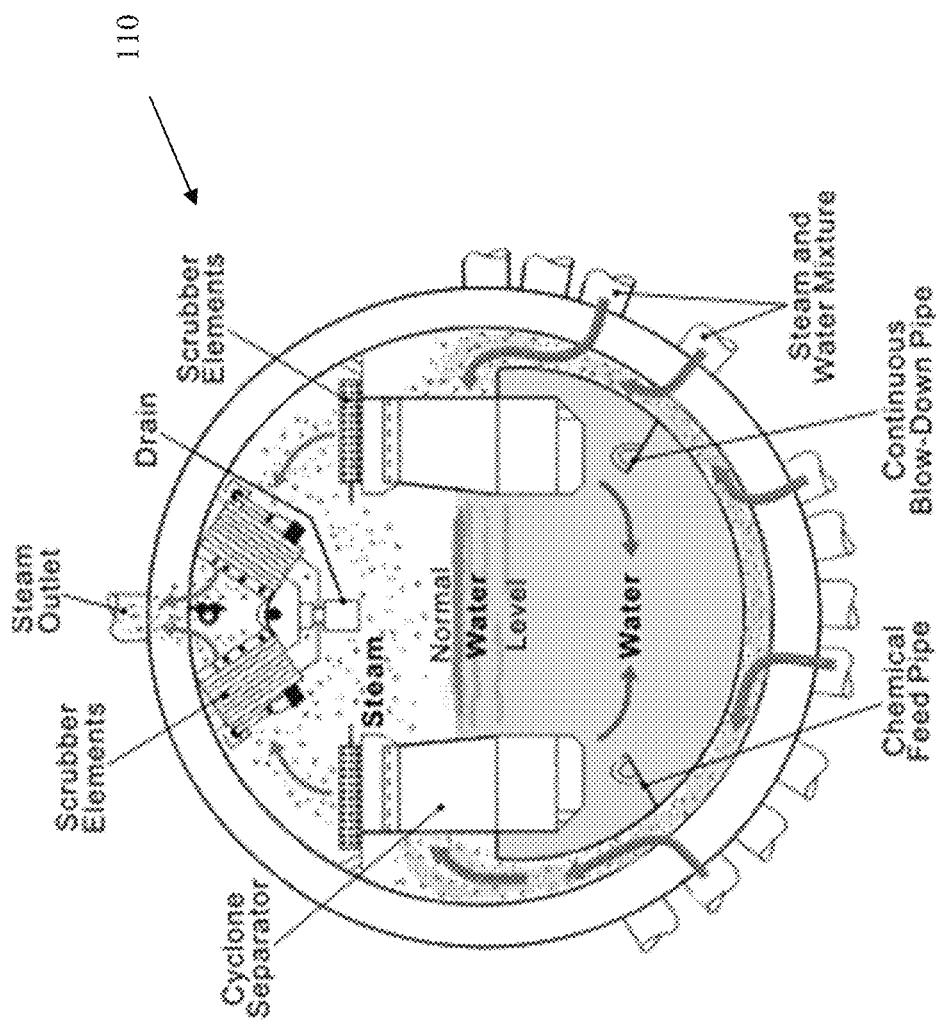
FIGS. 7-11 are cross sectional views of various devices for separating and recycling condensing liquid water from the superheated water in accordance with still yet other embodiments of the present disclosure.
Figure 8:
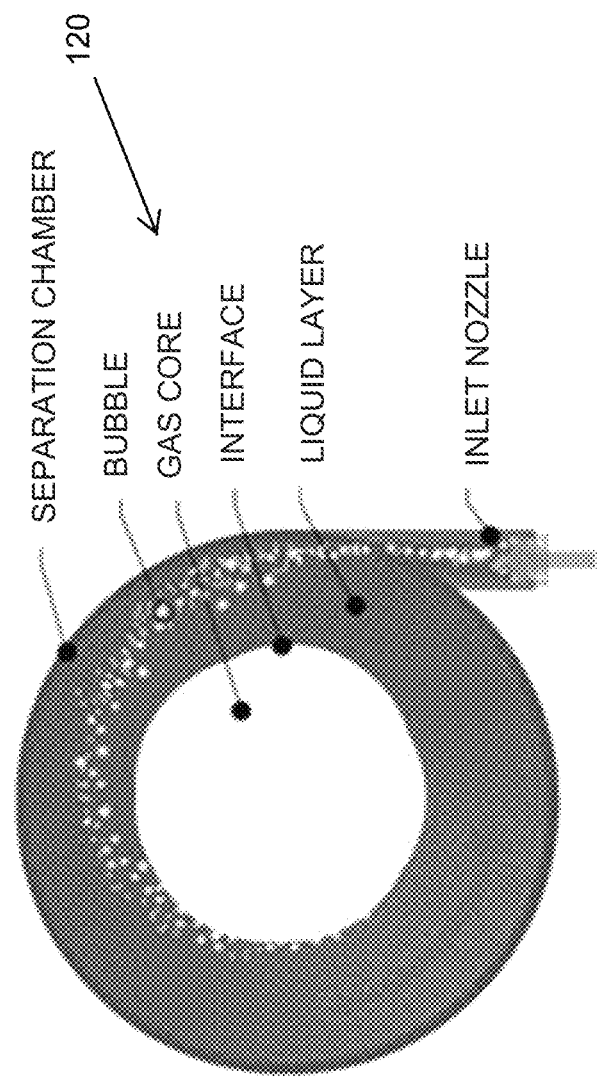
Figure 9:
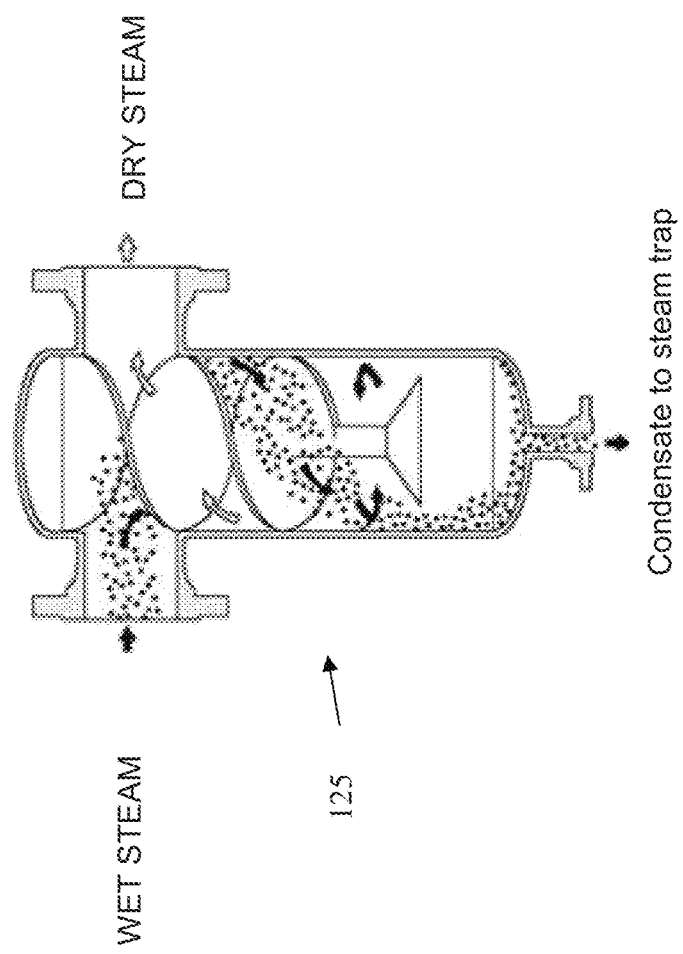
Figure 10:
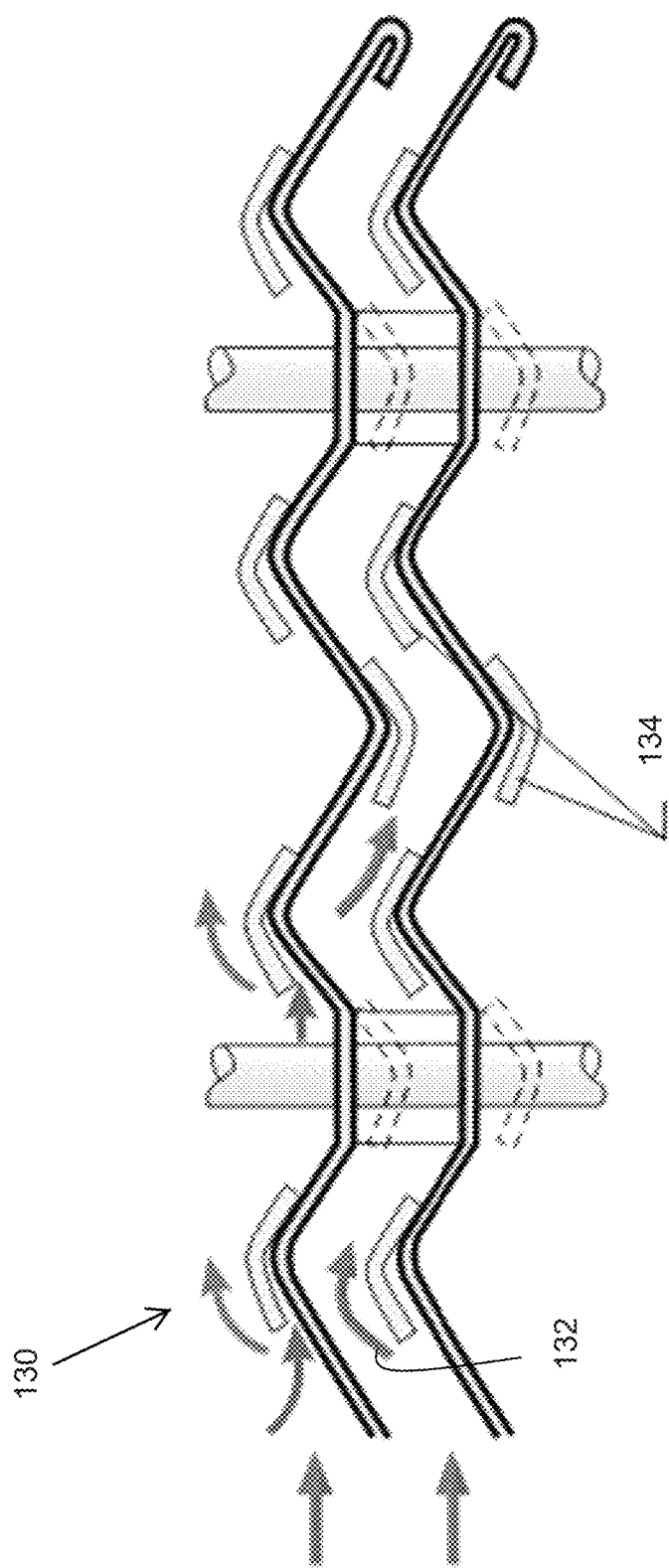

Referring to FIG. 6, in yet another embodiment, the superheated water as a liquid phase at high pressure (100 MPa) is passed from photon reactor section 22 via a blow off valve 90 where the superheated water expands to a gas phase before being flowed into the converging section 82 of the nozzle 84 and then through throat section 86 and diverging section 89 of the nozzle 84, creating thrust.

In one embodiment, electromagnetic radiation absorbers are mixed with the water for enhancing water heating. The electromagnetic radiation absorbers are high temperature resistant to melting and absorb the emitted photons, e.g., UV light. Suitable UV absorbers include tantalum carbine (melting point 4041° K), hafnium carbide (melting point 4232° K) and mixtures thereof, and carbon black (melting point 4099° K). These materials are preferred as they absorb UV light below 3 nanometers.

Figure 11:
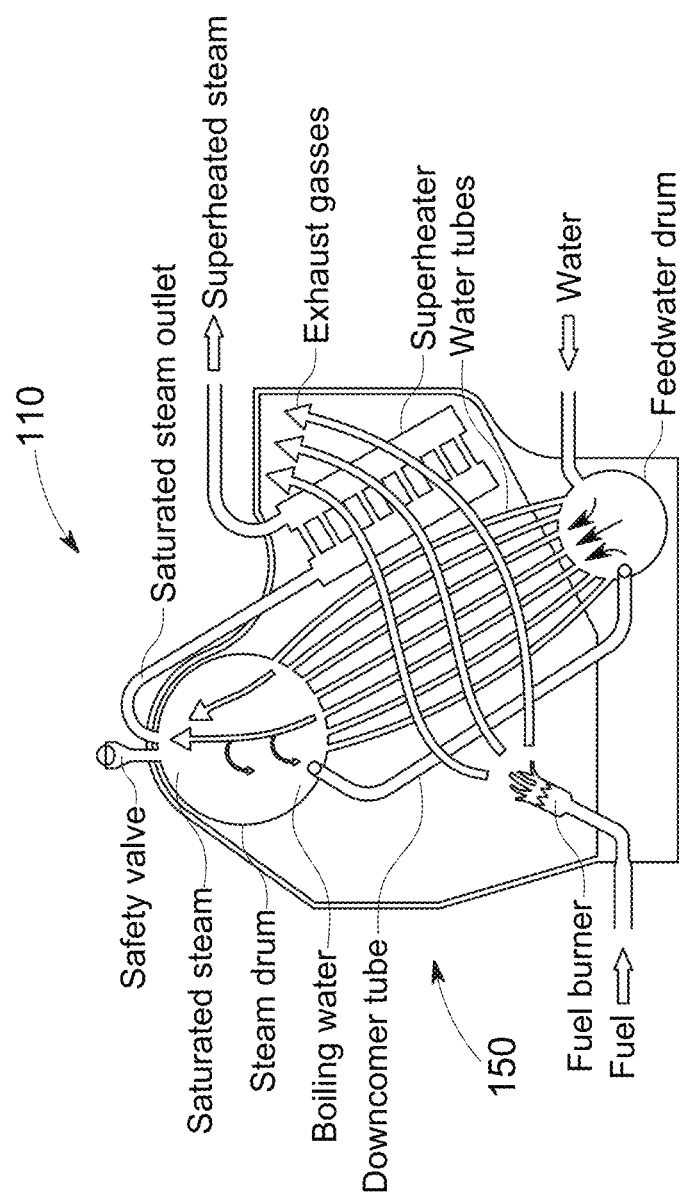

Referring also to FIGS. 7-11, in order to enhance efficiency of use of the water propellant, devices may be provided for separating steam from water droplets and for recycling the water droplets back to the photon reactor section 22 to ensure substantially all water is converted to steam. These include a cyclone separator 110 (FIG. 7), a centrifuge separator 120 (FIG. 8), a cyclone separator 125 (FIG. 9), or a chevron and screen vane separator 130 (FIG. 10) in which the superheated water vapors are directed to flow tortuous paths 132 in which liquid water droplets fall out and may be drained via a drainage scoops 134 and recycled. Alternatively, we may employ a steam drum 150 (FIG. 11).

Figure 12:
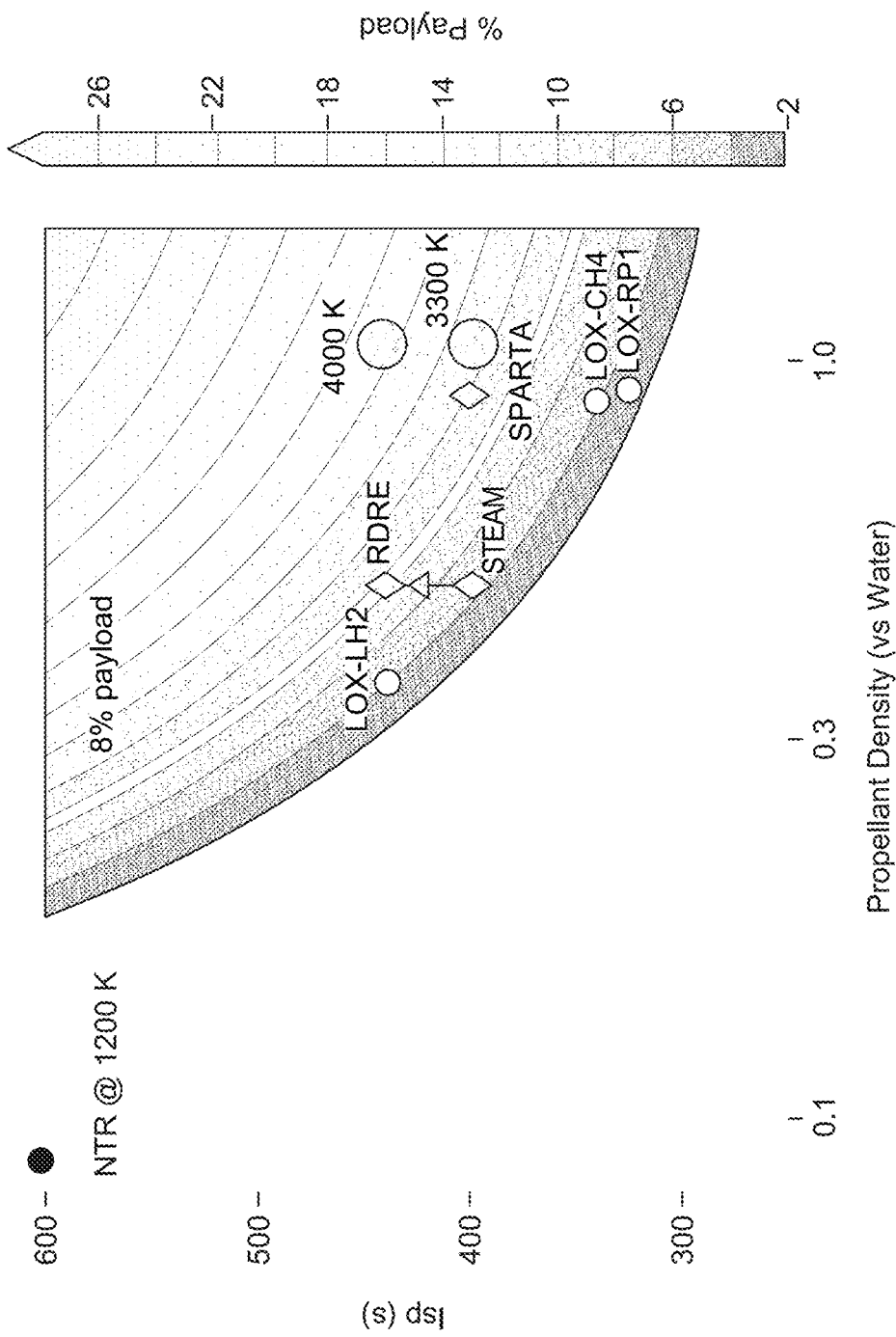
FIG. 12 is a plot of propellant density (vs. water) as a percent of payload.

FIG. 12 demonstrates the significantly higher payload fraction achieved using superheated water as the "propellant" in accordance with the present disclosure as compared to conventional combustion fuel rockets. Yet another advantage of employing water as the propellant in accordance with the present disclosure is that water is inherently stable, and can be stored indefinitely. Also, with the present disclosure, we may control thrust by controlling photon flux and water flow.

Various changes may be made without departing from the spirit and scope of the disclosure. For example, the water may be heated as a liquid phase a high pressure in a first chamber to prevent vibration/thermal transfer from boiling throughout a large region of the system before transfer to a second chamber.

What is claimed:

1. A rocket configured to employ superheated water as a propellant,
   wherein the rocket includes a reactor system including a photon generator configured to generate photons to superheat water;
   wherein the photon generator is held within or adjacent a water tight sealed enclosure having one or more walls formed of a high temperature resistant material substantially transparent to the electromagnetic radiation; and
   wherein the photon generator is configured to emit photons into an interior of a photon reaction section, wherein the photon reaction section includes a watertight tank having interior walls coated with a material reflective to the emitted photons.

2. The rocket of claim 1, wherein the photon generator is configured to emit 10 nm UV light.

3. The rocket of claim 1, wherein the high temperature resistant material forming the wall(s) is selected from the group consisting of magnesium ($MgAl_2O_3$), aluminum oxynitride, Yttralox ($Y_2O_3$ containing $ThO_2$), yttrium aluminum garnet and porous silica.

4. The rocket of claim 1, wherein the water includes one or more powder materials configured to increase or decrease absorption of the electromagnetic radiation.

5. The rocket of claim 4, wherein the one or more materials are selected from the group consisting of tantalum carbine, hafnium carbide and carbon black.

6. The rocket of claim 1, wherein the photon generator is powered by electrical energy provided by an on-board nuclear reactor.

7. The rocket of claim 6, wherein the electrical energy is produced by an on-board electrical energy generator powered by thermal energy from the nuclear reactor.

8. The rocket of claim 7, wherein the on-board electrical energy generator comprises a Rankine cycle or Sterling cycle electric steam generator.

9. The rocket of claim 7, wherein the on-board electrical energy generator comprises a thermoelectric generator, a pyroelectric generator, a thermionic generator or a magnetohydrodynamic generator.

10. The rocket of claim 1, further comprising one or more of a steam drum, a cyclone separator, a centrifuge separator, and a chevron and screen vane separator configured for separating liquid water droplets from the superheated water.

11. The rocket of claim 6, wherein the water propellant is pre-heated using the water as a coolant for one or more of the rocket engine walls and the on-board nuclear reactor.

12. The rocket of claim 1, wherein side walls of the photon generator are surrounded by heat exchanger jackets for cooling.

* * * * *